United States Patent [19]

Senga

[11] Patent Number: 4,577,596
[45] Date of Patent: Mar. 25, 1986

[54] INTAKE MANIFOLD STRUCTURE FOR A V-TYPE INTERNAL COMBUSTION ENGINE

[75] Inventor: Akihisa Senga, Saitama, Japan

[73] Assignee: Honda Giken Kogyo Kabushiki Kaisha, Tokyo, Japan

[21] Appl. No.: 563,942

[22] Filed: Dec. 21, 1983

[30] Foreign Application Priority Data

Dec. 22, 1982 [JP] Japan .................. 57-228866

[51] Int. Cl.$^4$ ............................................. F02B 75/22
[52] U.S. Cl. ................................................ 123/52 MV
[58] Field of Search ........ 123/52 M, 52 MV, 52 MC, 123/52 MB, 55 VS

[56] References Cited

U.S. PATENT DOCUMENTS 2,916,027  12/1959  Chayne et al. ............... 123/52 MV
3,303,832  2/1967   Platner et al. ................ 123/52 M
3,500,805  3/1970   Reisacher ...................... 123/52 MV
4,228,769  10/1980  Gartner et al. ................ 123/52 M

FOREIGN PATENT DOCUMENTS 2930697  2/1981  Fed. Rep. of Germany ........ 123/52 MV Primary Examiner—Craig R. Feinberg
Attorney, Agent, or Firm—Lyon & Lyon

[57] ABSTRACT

An intake manifold for a V-type internal combustion engine with supply tubes in the shape of a horse-shoe. Branch tubes are integrally formed with the supply tube to provide communication between the supply tube and the cylinder intake port. Fuel injection nozzle mounting holes are formed in the branch tubes at a point just above each cylinder intake port.

8 Claims, 3 Drawing Figures

INTAKE MANIFOLD STRUCTURE FOR A V-TYPE INTERNAL COMBUSTION ENGINE

The present invention relates to an improvement in the intake manifold structure for a V-type internal combustion engine. A typical V-type internal combustion engine has two banks of cylinders, one on the left and one on the right. An intake manifold for distributing air among the respective cylinders is interposed between the left and right cylinder banks in order to make the engine compact. Engine performance can be improved by utilizing the inertia of the intake air entering the engine and minimizing the resistance to the flow of such intake air. This can be done with an intake manifold with air passages of sufficient lengths and effective areas to optimize the performance of the engine. As engines have decreased in size due to space and weight considerations, difficulties arise in maintaining the requisite lengths and effective areas to optimize the engine's performance.

It is an object of the present invention to provide an intake manifold structure for a V-type internal combustion engine in which the length and effective area of the respective branch tubes of the intake manifold allow engine performance to be optimized. It is a further object of the invention to minimize the size of such an intake manifold so that it may be interposed between the left and right banks of a small V-type engine in a compact fashion. Additional and further objects of the present invention will become obvious from examination of the specification and drawings contained herein.

In order to achieve the object of the invention, the intake manifold set forth herein has two supply tubes extending to the left and the right from the engine air inlet. A portion of each said supply tube extends parallel to its corresponding bank of cylinders thus forming a shape substantially that of a horse-shoe. A plurality of branch tubes, corresponding to the number of cylinders in the engine, extend from each supply tube. The other end of the branch tubes are open so that they may be connected to the cylinder intake ports. Fuel injection nozzle openings are formed in the open ends of each branch tube in order to accommodate fuel injection nozzles.

One embodiment of the invention will be described in detail with reference to the accompanying drawings, wherein.

Figure 3:
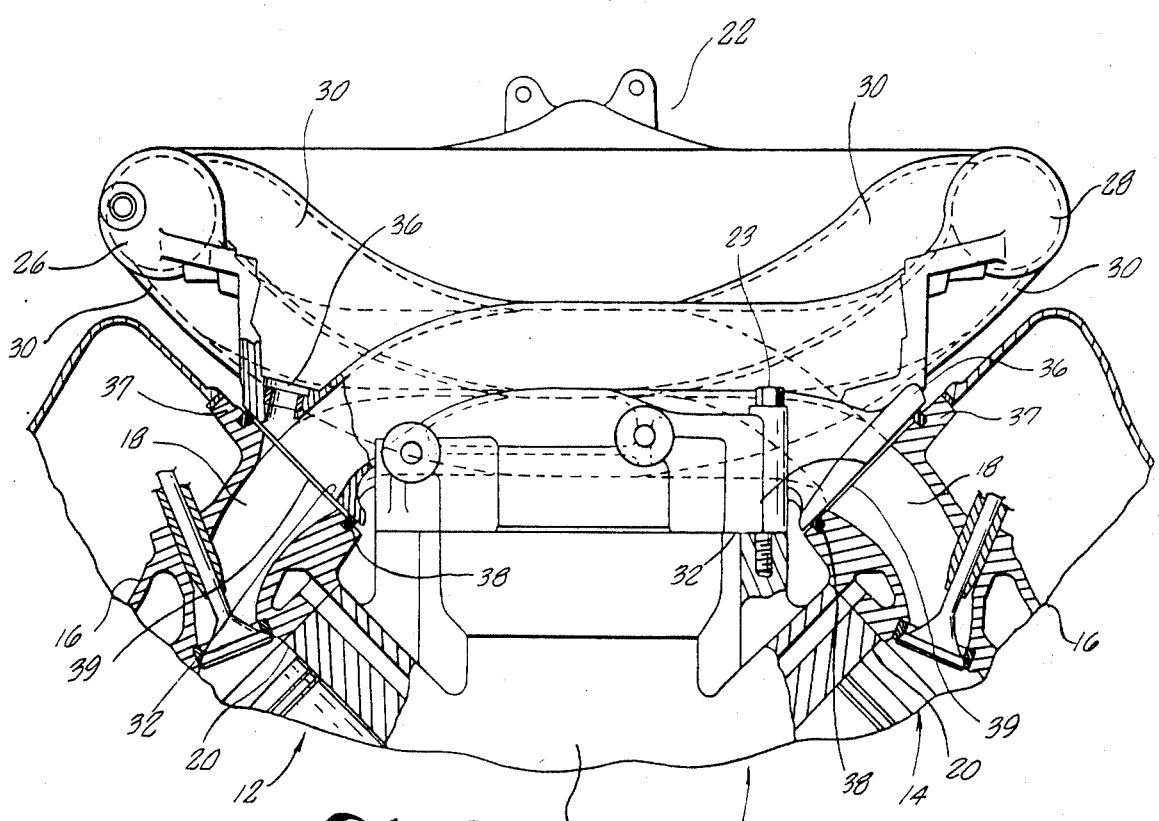
FIG. 3 is a partially sectioned front elevation showing one embodiment of the intake manifold mounted atop an upper portion of a V-type engine.

Referring to the drawings, as shown in FIG. 3, a V-type 6-cylinder internal combustion engine 10 has a cylinder block 11 with a left cylinder bank 12 and a right cylinder bank 14. A cylinder head 16 with a cylinder intake port 18 corresponding to each cylinder 20 is mounted atop each cylinder bank 12, 14. Bolts 23 are used to mount an intake manifold 22 between the left cylinder bank 12 and the right cylinder bank 14 to insure uniform distribution of the intake air. Air enters the intake manifold 22 through an air intake inlet 25 and a throttle body 24.

Figure 1:
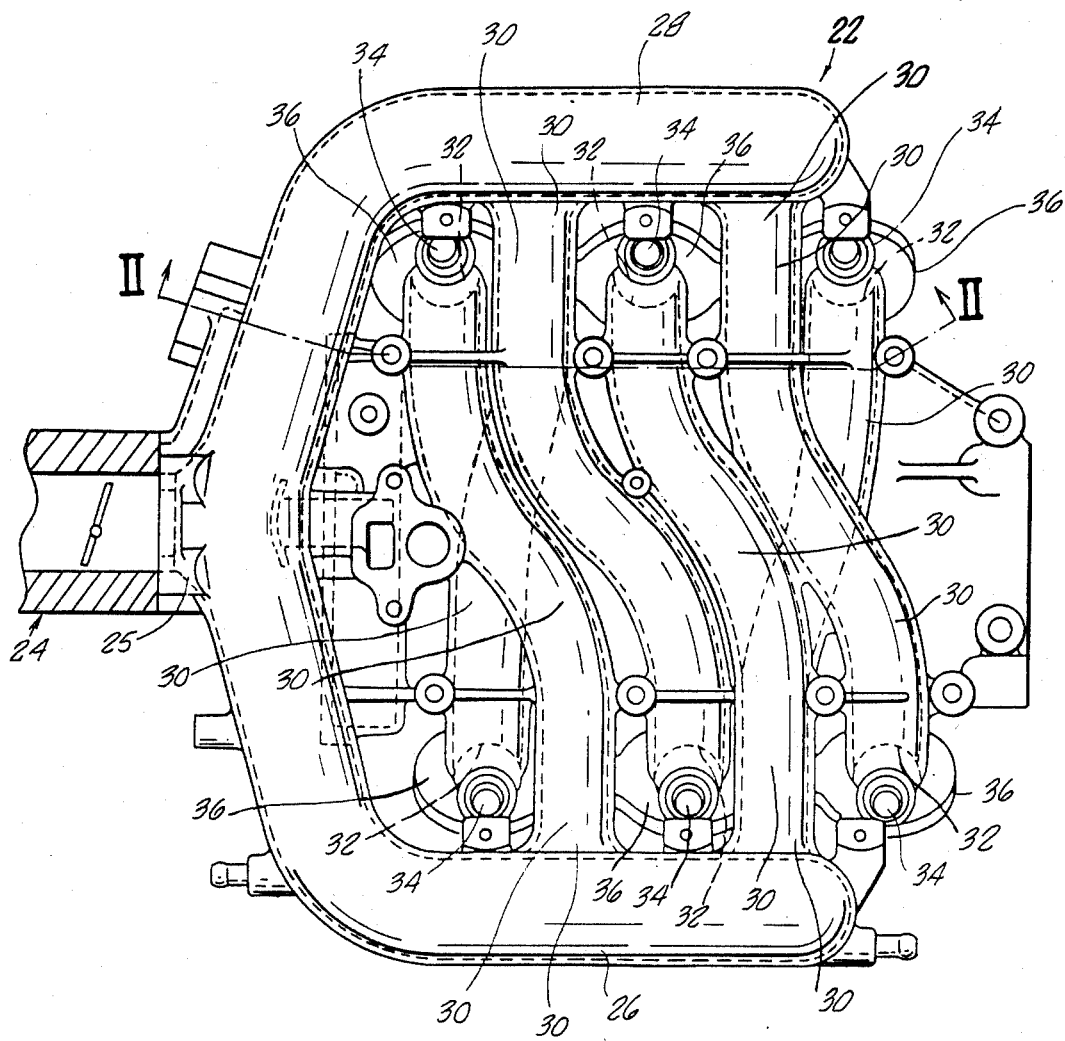
FIG. 1 is a top plan view showing the intake manifold.

As shown in FIG. 1, the intake manifold 22 has a left supply tube 26 and a right supply tube 28. Branch tubes 30 extend from each supply tube 26, 28, in a direction substantially perpendicular thereto, and are connected to a cylinder inlet port 18. In the case of a 6-cylinder engine, as shown in FIG. 1, three branch tubes 30 will be formed from each supply tube 26, 28. The branch tubes 30 are arranged so that the open ends 32 of the branch tubes 30 from the left supply tube 26 alternate with the integral portion of the branch tube 30 formed in the right supply tube 28.

Figure 2:
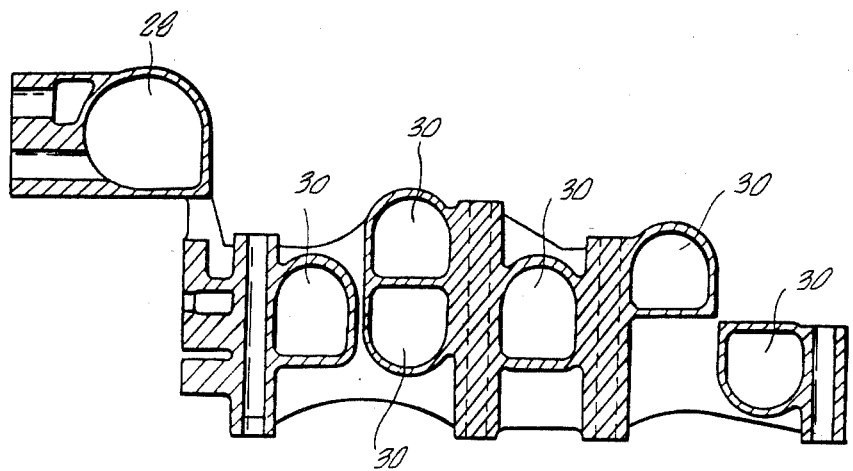
FIG. 2 is a section-view taken substantially along line II—II of FIG. 1.

As shown in FIGS. 1 and 2, when used with a 6-cylinder engine, the intake manifold branch tubes are arranged such that two of the branch tubes 30 are vertically aligned so as to require only one integral connection to the left supply tube 26. Similarly, two of the branch tubes 30 formed on the right supply tube 28 are vertically aligned. This enables the supply tube 26, 28 to be shorter in length thus allowing the intake manifold 22 to be more compact.

The open ends 32 of the branch tubes 30 have fuel injection nozzle mounting holes 34 formed therein. Flanges 36 are formed about each open end 32 to connect each said branch tube 30 to the cylinder intake port flanges 37 formed at the cylinder head 16 so that the open ends 32 of the branch tubes 30 can mate with the open ends 39 of the cylinder intake ports 18. Seal packings 38 are used between the branch tube flanges 36 and the cylinder intake port flanges 37 so that the branch tubes 30 are mounted in a floating manner with respect to the cylinder head 16.

By utilizing the above structure, the invention enables the engine's performance to be optimized by maintaining sufficient length and effective area in the branch tubes 30 in order to minimize the flow resistance of the intake air and to effectively use the inertia of the incoming air. The vertical alignment of two branch tubes 30 from each supply tube 26, 28 enables the intake manifold 22 to be constructed in a compact manner to facilitate smaller engines. The fuel injection nozzle holes 34 are arranged on top of the flanges 36 of the branch tubes 30 so as to provide access for easy installation or removal of the not-shown fuel injection nozzles.

Although a preferred embodiment of the invention is described herein above, it is not intended to limit the nature or scope of the invention thereby described. In particular, the reference to a 6-cylinder V-type internal combustion engine is not a limitation on the present invention since the intake manifold could easily be applied to other V-type multi-cylinder engines.

What is claimed is:

1. An intake manifold for a V-type internal combustion engine with two cylinder banks and a plurality of cylinder inlet ports, comprising, an air inlet opening, two supply tubes connected to said inlet opening, said supply tubes arranged substantially in the shape of a "U", each said supply tube being mounted substantially above and parallel to one cylinder bank, a plurality of branch tubes formed longitudinally along each said supply tube and extending across the engine with an open end extending substantially perpendicular to said supply tubes, said branch tubes being arranged such that at least two of said branch tubes extending from the same supply tube are vertically aligned one on top of the other at the supply tube along a plane normal to said supply tube and for a portion of their lengths extending from that supply tube, and means to connect each said branch tube open end to a cylinder inlet port on an opposite side of the engine from the supply tube to which that branch tube is connected.

2. The intake manifold as set forth in claim 1 wherein an opening is formed in each said branch tube near the connection to the cylinder inlet port for receiving a fuel injection nozzle.

3. The intake manifold as set forth in claim 1 wherein said branch tubes extend across the engine to said cylinder inlet ports.

4. The intake manifold as set forth in claim 3 wherein said branch tubes extending from said supply tubes are spaced so as to alternate with said branch tube open ends extending from said supply tube on the opposite side of the intake manifold.

5. The intake manifold as set forth in claim 3 wherein said branch tubes are integrally formed with its respective supply tube.

6. An intake manifold for a V-type internal combustion engine with left and right cylinder banks, an engine air inlet passage, cylinder intake ports and a plurality of fuel injection nozzles, comprising, a supply tube connected to the engine air inlet passage, said tube being arranged in a substantially horse-shoe shape such that a first said end is substantially aligned with the left bank of cylinders and a second said end is substantially aligned with the right bank of cylinders, a plurality of branch tubes extending across the engine with two ends, one said end in communication with said supply tube and the other said end being opened, said branch tubes being arranged such that at least two of said branch tubes having their said one ends in communication with the same end of the supply tube are vertically aligned one on top of the other at the supply tube along a plane normal to said supply tube and for a portion of those said branch tubes extending from that said supply tube, holes formed in each said branch tube open end with means to secure the fuel injection nozzle therein, and means to secure each said open end to a cylinder intake port on an opposite side of the engine from the supply tube to which that branch is connected.

7. The intake manifold as set forth in claim 6 wherein said fuel injection nozzle openings are formed such that the nozzle is located between its corresponding cylinder intake port and one said branch tube end.

8. The intake manifold as set forth in claim 6 wherein said ends of said branch tubes in communication with said first supply tube end alternate with said open ends of said branch tubes in communication with said second supply tube end.

* * * * *